United States Patent [19]

Gellman et al.

[11] Patent Number: 4,551,343

[45] Date of Patent: * Nov. 5, 1985

[54] CANINE BISCUIT CONTAINING DISCRETE MEAT AND/OR MEAT BY-PRODUCT PARTICLES AND METHOD FOR MAKING SAME

[75] Inventors: Gary Gellman, Pomona, N.Y.; George A. Erburt, Morristown; James E. Roe, Wayne, both of N.J.

[73] Assignee: Nabisco Brands, Inc., Parsippany, N.J.

[ * ] Notice: The portion of the term of this patent subsequent to Jun. 12, 2001 has been disclaimed.

[21] Appl. No.: 614,601

[22] Filed: May 29, 1984

Related U.S. Application Data

[63] Continuation-in-part of Ser. No. 341,969, Jan. 22, 1982, Pat. No. 4,454,163, and a continuation-in-part of Ser. No. 549,352, Nov. 7, 1983.

[51] Int. Cl.$^4$ .............................................. A21D 10/00
[52] U.S. Cl. .................................. 426/549; 426/466; 426/512; 426/646; 426/805
[58] Field of Search ............... 426/549, 555, 560, 630, 426/634, 466, 512, 623, 646, 635, 805, 4, 454, 163, 352

[56] References Cited

U.S. PATENT DOCUMENTS

| | | |
|---|---|---|
| D. 13,522 | 1/1883 | Hartman . |
| D. 16,848 | 8/1886 | Stauffer . |
| D. 17,757 | 10/1887 | Hartman . |
| D. 21,084 | 9/1891 | Bayle . |
| D. 21,085 | 9/1891 | Bayle . |
| D. 21,087 | 9/1891 | Bayle . |
| D. 54,074 | 11/1919 | Fritz . |
| D. 55,542 | 6/1920 | Wipf . |
| D. 70,354 | 6/1926 | Bennett . |
| D. 73,067 | 5/1927 | Chambers . |
| D. 125,110 | 2/1941 | Manischewitz . |
| D. 127,460 | 5/1941 | Thomas . |
| D. 180,900 | 9/1957 | Gilmore . |
| D. 185,389 | 6/1959 | Popovich . |
| D. 202,330 | 9/1965 | Fisher . |
| D. 202,331 | 9/1965 | Fisher . |
| D. 202,332 | 9/1965 | Fisher . |
| D. 207,167 | 3/1967 | Fisher . |
| D. 207,699 | 5/1967 | Scharschmidt et al. . |
| D. 212,580 | 11/1968 | Sautier et al. . |
| D. 213,945 | 4/1969 | Cooper et al. . |
| D. 228,320 | 9/1973 | Forbes et al. . |
| D. 228,321 | 9/1973 | Vondel et al. . |
| D. 234,983 | 4/1975 | Hirsh . |
| D. 240,770 | 8/1976 | French . |
| D. 241,184 | 8/1976 | French . |
| D. 247,071 | 1/1978 | Neidenberg et al. . |
| D. 254,336 | 3/1980 | Miller et al. . |
| D. 254,337 | 3/1980 | Miller et al. . |
| D. 254,338 | 3/1980 | Miller et al. . |
| D. 254,339 | 3/1980 | Miller et al. . |
| 982,711 | 1/1911 | Ellis . |
| 2,246,770 | 6/1941 | Wessel ........................ 99/2 |
| 2,612,123 | 9/1952 | Nord . |
| 2,874,649 | 2/1959 | Pelletier ..................... 107/54 |
| 3,024,112 | 3/1962 | Burgess . |
| 3,060,494 | 10/1962 | Noble ......................... 17/32 |
| 3,104,648 | 2/1962 | Fisher . |
| 3,368,528 | 2/1968 | Ganoe . |
| 3,567,459 | 3/1971 | Wruk et al. ................. 99/2 |
| 3,830,798 | 8/1974 | Herndon et al. ........ 260/211.5 R |
| 3,891,774 | 6/1975 | Baker et al. ............... 426/104 |
| 3,899,607 | 8/1975 | Miller et al. ............... 426/285 |
| 3,908,025 | 9/1975 | Miller et al. ............... 426/623 |
| 4,032,665 | 6/1977 | Miller et al. ............... 426/104 |
| 4,294,857 | 10/1981 | Fuller ........................ 426/99 |

OTHER PUBLICATIONS

Advertisement, "Bones vs. Bonz", Better Homes and Gardens, (Apr. 1980), p. 70.
Advertisement, Restaurants and Institutions, (Jan. 15, 1981), p. 107.
Advertisement, Better Homes and Gardens, (Feb. 1981), p. 23.
Rossen and Miller, "Food Extrusion", Food Technology, Aug. 1973, pp. 46 to 53.

Primary Examiner—R. B. Penland

[57] ABSTRACT

A dry hard canine biscuit having visually apparent, discrete meat and/or meat by-product particles distributed substantially uniformly through the biscuit is obtained by blending the non-fat solids portion of a canine biscuit dough with the particles which are substantially inert with respect to the dog biscuit dough, mixing the dry-blended mixture with water and with the fat portion of the pet biscuit dough to form a dough, forming the dough into pieces using low-shear, non-cooking forming conditions, and baking and drying the formed pieces to obtain a microbiologically stable product which can be packaged without a barrier material. Meat and/or meat by-product particle inertness is made possible by using particles having (1) a moisture content of 35 percent by weight or less and (2) a water activity which is less than the water activity of said biscuit dough. The substantial absence of meat particle color bleed into the biscuit is principally due to the use of meat products wherein the color is formed as part of the protein matrix. The discrete, visually apparent dehydrated meat particles enhance the palatability and visual attractiveness of the dry biscuit.

20 Claims, No Drawings

CANINE BISCUIT CONTAINING DISCRETE MEAT AND/OR MEAT BY-PRODUCT PARTICLES AND METHOD FOR MAKING SAME

This is a continuation-in-part of U.S. application Ser. No. 341,969, filed on Jan. 22, 1982 U.S. Pat. No. 4,454,163, and is a continuation-in-part of U.S. application Ser. No. 549,352, filed on Nov. 7, 1983.

BACKGROUND OF THE INVENTION

1. Field of the Invention

The invention relates to a method for incorporating animal protein into a biscuit dough to obtain a dry, hard canine biscuit. The invention also relates to a dry, hard canine biscuit.

2. Description of the Prior Art

Dry pet foods are commonly cereal type materials having a low moisture content of less than about 15 percent by weight. As a result of their low moisture content, they resist mold growth and bacterial spoilage. Additionally, they can often be packaged and stored in containers, such as a box, without the need for hermetic sealing and without the need for a moisture barrier. Dry pet foods typically have low palatability because of their low moisture content.

The incorporation of meat products, fish products and poultry products into a farinaceous pet food to improve palatability and to improve nutritional values of dry pet foods, intermediate moisture products and high moisture content pet foods (more than about 50 percent by weight water) is known in the art.

U.S. Pat. No. 3,946,123 discloses an aqueous suspension or broth of meat and meat by-products consisting in part or entirely of fish and flavored cereal chunks. The meat and meat by-products that may be used include those of fowl and fish as well as that of mammal such as cattle, swine, goats and the like. Due to the high moisture content of the product, it must be packaged in cans. In U.S. Pat. No. 4,158,706 a high moisture pet food product containing farinaceous and proteinaceous components such as meats, fish and poultry is impregnated with a preservative such as succinic acid to enable packaging within a paper or polymer film. These high moisture content products have a high shipping weight for a given amount of nutritive value and do not provide a hard surface for the strengthening of gums and for the removal of plaque from teeth.

The production dry pet foods which contain proteinaceous and farinaceous material is disclosed in U.S. Pat. Nos. 3,962,462, 4,020,187, 4,039,689, 4,055,681, 4,145,447, 4,215,149 and 4,229,485.

In U.S. Pat. No. 3,962,462 the ingredients are first dry-blended and then water and water-containing ingredients are added until a cohesive dough is formed. A stabilizing system comprising a sugar, an edible acid and an antimycotic provides stability within the pet food when the pet food is subjected to semi-moist conditions. The product is produced in wafer form for packaging with a semi-moist pet food. The proteinaceous material includes meat, such as the flesh of cattle, swine, sheep, poultry and fish as well as various meals such as meat and bone meal, fish meal and the like.

In U.S. Pat. No. 4,020,187 tallow or lard is added to a water slurry of a ground mixture of meat and meat by-products to raise the resulting fat content of the mixture to at least 25 percent. The resultant mixture is then homogenized to liquefy and reduce the particle size to uniformly distribute the fat content through the meat mixture. Dry farinaceous ingredients are ground and added to the homogenized meat mixture. The blended mixture is subjected to a temperature of from 225° to 325° F. at a pressure of at least about 50 p.s.i. The product is expanded, cut and dried to obtain a product having a final moisture content of from 7 to 15 percent. The product, it is disclosed, is not externally greasy and may be packaged in ordinary paper bags or in plastic wrap.

A dry, but soft, pet food is produced in U.S. Pat. No. 4,039,689 using low temperatures and pressures. The use of the low processing temperatures, less than about 130° F., leads to the soft dry nature of the pet food, it is disclosed. Meat and meat by-products as well as dried animal by-products can be used as a protein source for the pet food in U.S. Pat. No. 4,039,689. The dried animal by-products include meat and bone meal.

U.S. Pat. No. 4,055,681, like U.S. Pat. No. 4,039,689, produces a soft dry pet food having a meat-like texture and appearance. Meat meal is disclosed as a protein source and fresh meat and meat by-products are used to impart palatability to the pet food.

In the production of the dry pet food products according to the processes of the above patents, the use of wet meat products cause substantial smearing or blending of the meat into the farinaceous material. It also causes bleeding of the protein colors into the farinaceous material which reduces the visual attractiveness of the product to the consumer and which reduces the product's hardness.

A hard dry pet food is produced in U.S. Pat. No. 4,145,447. High pressures of at least about 100 p.s.i. are used to obtain a product which is hard enough to provide chew-resistance for the removal of plaque or tartar from the animal's teeth. The product is a long-lasting one which requires about 30 minutes to 2 hours for a 25 lb. dog to consume. Dry components are mixed until homogeneous and then sufficient water is added to wet the product without affecting the apparent dry, free-flowing characteristic of the product. The wetted product is then compacted, at a pressure of at least 100 p.s.i., followed by heating or baking the compacted product at a temperature of at least 200° F. The product can contain air-dried, freeze-dried or irradiated foods such as meat, fish, fish meal, cereals, fruits, vegetables and the like. Protein fibers, such as those derived from soy protein and wheat gluten, or animal fibers, such as those derive from skin, muscles, and intestines, are optionally added to support the structure of the product. The animal fibers can be prepared by cutting, chipping, grinding, shredding, shearing or beating animal skins such as cowhide or rawhide. The high pressures used in the process of U.S. Pat. No. 4,145,447 make the process costly. Also, the structure-supporting fibers derived from animal tissue, which are optionally used in the process of U.S. Pat. No. 4,145,447, are low in palatability. Furthermore, a product having discrete, visually apparent, meat particles is not disclosed.

U.S. Pat. Nos. 4,125,149 and 4,229,485 disclose processes for improving the palatability of dry pet foods by applying a coating which contains proteins derived from animals, to the surface of the pet food. In U.S. Pat. No. 4,215,149 the surface of the pet food is treated with fat and then with a phosphoric acid salt. Treatment of the surface of the pet food with meat flavors and animal proteins is optional. Heating of the coated pet food, it is disclosed, must be avoided.

In U.S. Pat. No. 4,229,485 a dry biscuit is coated with a continuous glazed liver coating and is then baked to less than 18 percent moisture by weight. The liver preferably constitutes at least about 50 percent by weight of the coating, exclusive of moisture. The liver coating contains farinaceous material and comminuted liver. The hard glazed coating, it is disclosed, has the visual appearance of a meat coating to enhance the product's attractiveness to pets. The dry biscuits to which the liver coating is applied are obtained by baking a combination of uncooked farinaceous material and uncooked meat or meat by-products. The use of the uncooked meat or meat-products in the form of finely cut flakes, preferably having their largest dimension in the range of 15/1000 inch to 250/1000 inch, it is disclosed, is necessary for obtaining high palatability of the product. However, the use of uncooked meat or meat by-products results in the blending of the protein color into the farinaceous material. Additionally, the flakes present in the biscuit are not visually apparent because of the liver coating.

U.S. Pat. No. 4,310,558 teaches producing a dry pet food product containing fibrous food pieces having a tough, pliable texture combined with a basal matrix containing proteinaceous and farinaceous materials having a porous texture and appearance. The fibrous food pieces, which may simulate vegetables, grains and red meat pieces, comprise denatured proteinaceous material. The food pieces are blended with undenatured proteinaceous materials and farinaceous materials. The mixture is mechanically worked under conditions of elevated temperature and pressure and finally extruded to form an expanded dry pet food product having a porous texture interspersed with food pieces having a tough, pliable fibrous texture. The mechanical working and forming is basically done in a cooker extruder, which utilizes high shear and substantial pressure.

BROAD DESCRIPTION OF THE INVENTION

An object of the invention is to provide dry hard canine biscuits having discrete meat and/or meat by-products particles distributed substantially uniformly throughout the biscuits. Another object of the invention is to provide a method for making such dry hard canine biscuits. A further object of the invention is to provide dry hard canine biscuits and method of producing such biscuits which overcomes the disadvantages of the above prior art. Other objects and advantages of the prior art are set out herein or obvious herefrom to one ordinarily skilled in the art.

The object and advantages of the invention are achieved by the dry hard canine biscuit and the production method of the invention.

According to the invention, there is provided a dry hard canine biscuit having discrete, meat and/or meat by-product particles distributed substantially uniformly throughout the biscuit. The particles are visually apparent as discrete particles, do not separate from the remaining, or farinaceous portion of the biscuit during shipping, and enhance the palatability of the biscuit by providing a flavor impact. The product is highly stable and can be packaged directly into a paper board box. The method for making the dry hard canine biscuit of the present invention is economical, does not involve the use of high pressure and/or high shear to compact the biscuit dough as in U.S. Pat. Nos. 4,145,447 and 4,229,485, avoids substantial bleeding of the animal protein color into the farinaceous material, maintains particle discreteness and achieves substantially uniform distribution of the particles throughout the biscuit. It is not necessary to use a food grade dye in the particles.

The invention includes a method for making a dry hard canine biscuit having enhanced palatability and enhanced eye appeal. Discrete meat and/or meat by-products particles are distributed substantially uniformly throughout the dry biscuit and are visually apparent to the consumer as discrete particles. The presence of meat and/or meat by-products particles substantially above or on the biscuit surface is kept to a minimum to reduce the opportunity for meat particle loss from physical abuse during transit. This particle distribution is accomplished by first dry-blending the meat and/or by-products particles with the non-fat solids portion of a biscuit dough, admixing the dry-blended mixture with water and then adding the fat portion of the biscuit dough to form a dough. The invention process forms the dough using low pressure and/or low-shear (preferably as little pressure and/or shear as possible) forming means or techniques. Alternatively, the water and fat can be admixed simultaneously with the dry-blended mixture. Visual awareness and biscuit hardness maintenance of the meat and/or meat by-products particles is achieved by using particles which are inert with respect to the biscuit dough. Inertness of the meat and/or meat by-products particles is made possible through the use of particles: (a) having a moisture content of 35 percent by weight or less; and (b) having a water activity which is less than the water activity of the biscuit dough during mixing, if the biscuit dough ingredients were mixed without the meat and/or by-products particles.

DETAILED DESCRIPTION OF THE INVENTION

The dry, hard canine biscuit of the invention comprises discrete, visually apparent meat and/or meat by-product particles which are uniformly distributed throughout the biscuit. The remaining, or non-meat and/or non-meat by-product particle portion of the biscuit is substantially free of meat particle color. The biscuits are very stable microbiologically, and can be stored without refrigeration and without a packaging barrier material such as plastic film. The biscuit can be in various shapes such as square, round, triangular, animal-shaped and the like. The preferred shapes are round, T-bone shape and a chop or steak-like shape. The biscuits can have a thickness typical of canine biscuits. A preferred thickness is about ½ inch.

The meat and/or meat by-product particles used in the invention can be in the form of specs, flakes, chunks, chips, granules and the like. The particles should be of sufficient size so as to be visually apparent to the consumer as discrete particles when in the biscuit of the invention. Prior to incorporation into the biscuit, the meat and/or by-product particles should preferably have a diameter of granulation of between about 1/32 of an inch and ½ of an inch. The final biscuit will have particles approximately in this size range too. Mixtures of particles within this size range or particles having a given size within this range can be used.

Particle visual awareness and biscuit hardness maintenance are achieved by using meat and/or meat by-products particles which are inert with respect to the biscuit. By meat and/or meat by-product particle "inertness" is meant: (a) that the particle does not smear into the biscuit dough and retains its intergrity through production of the final product; (b) that the meat and/or meat by-product particle color does not substantially bleed into the biscuit dough; and (c) that ingredients within the meat and/or meat by-product particles do not adversely affect the hardness and microbiological stability of the final biscuit product.

Meat and/or meat by-product particle inertness is made possible by using meat and/or meat by-product particles having: (1) a moisture content of about 35 percent by weight or less; and (2) a water activity which is less than the water activity of the biscuit dough during mixing of the dough, if the biscuit dough ingredients were mixed without the meat or meat by-product particles. The lower water activity of the meat and/or meat by-product particles substantially prevents the flow of water and protein color from the particles to the dough during mixing of the dough ingredients and the particles. Higher moisture content and water activity above that of the dough would cause smearing of the softer particles into the dough, thereby losing meat and/or meat by-product particle integrity. Also, higher moisture contents could create hardness reduction by the formation of steam pockets which turn into air voids upon biscuit leavening. The discreteness of the particles is locked in during drying of the dough.

Fresh meat and/or meat by-products can be dehydrated by known methods to achieve a moisture content of less than about 35 percent by weight. Dehydration also reduces the water activity of the meat and/or meat by-products. Generally, fresh beef has a moisture content of about 65 percent by weight and a water activity of about 1.0. Dehydrating the fresh meat to a moisture content of about 40 percent results in a water activity of about 0.8. Dehydration to about 12 to 20 percent by weight of water results in a water activity for the meat of about 0.7 and lower. Biscuit doughs generally have a water activity of about 0.90 and above upon completion of mixing of the non-fat solids portion, the water and the fat portion of the dough. Preferably meat and/or meat by-products having a moisture content of less than or equal to about 20 percent by weight are used because they remain shelf stable without refrigeration prior to incorporation into the biscuit.

Microbiological stability of the meat and/or meat by product particle ingredient is preferably achieved through a low water activity of 0.70 or less. This low water activity is preferably achieved by dehydration. However, the water activity can alsos be lowered by other processes known in the art. For example, to reduce the water activity, food additives conventionally used for this purpose such as glycerin, propylene glycol, salt, corn syrup, sugar and the like can be included in the meat and/or meat by-product particles in conventional amounts.

Commercially available meats and/or meat by-products having the above low water activity can be used for the meat and/or meat by-product particle ingredient of the invention. Microbiological stability of the meat and/or meat by-products can be also be achieved even at water activities above 0.70 by the use of antimycotics and/or antibiotics conventionally used in the art for this purpose. Exemplary of the antimycotics which can used are potassium sorbate, sorbic acid, sodium benzoate and the like. Suitable commercially available meat products and/or meat by-products which can be used are those which are stored without refrigeration and are packaged in a film of no more than 5 g per sq. cm per 24 hours water vapor transfer rate. The meat and/or meat by-product particles should also be in compliance with NRC nutritional requirements such as 40 percent minimum protein content.

The substantial absence of meat and/or meat by-product particle color bleed into the biscuit is principally due to the use of meat products wherein the color is formed as part of the protein matrix. In these meat products the protein is present in its least soluble form, namely denatured and coagulated, and therefore the color is also insoluble. Accordingly, bleeding of the meat protein color into the remaining portion of the biscuit cannot take place.

Visual awareness of the meat particles is also effeced by using meat products having a dark brown denatured meat protein color. Products having a denatured meat protein color as measured by an Agtron reflectance value of 10 or less contrasts excellently with typical biscuit doughs to effect visual awareness.

The term "meat" is understood to apply not only to the flesh of cattle, swine, sheep, goats, horses and whales, but also to other sources of animal protein, such as poultry and fish. The term "meat by-product" refers to those non-rendered parts of the carcasses of slaughtered animals, including but not restricted to mammals, poultry and fish, and includes constituents such as liver, kidney, heart, spleen, tongue, trimmings, lungs and skins, embraced by the term "meat by-products" in the *Official Publication,* "Official and Tentative Definitions of Feed Ingredients," published by the Association of American Feed Control Officials, Inc., (1979), p. 94. The flesh of some animals, such as fish and poultry may be too light in color to provide sufficient contrast with the biscuit dough so as to enhance visual awareness of the meat particles. In this case, known food colorings can be added to the meat to enhance visual awareness. The meat particles and the meat by-product particles can be used alone or in combination. Each particle can contain both meat and meat by-products from one or more animals.

The preferred meat and/or by-product particles are particles of dehydrated cured meat, most preferably from ground beef. Spiced, dehydrated cured meat particles are highly palatable, have an appetizing odor and are particularly preferred for use in the canine biscuits of invention. The preparation of dehydrated cured meat, spiced or unspiced, is well-known in the art and does not form a part of the invention. Suitable dehydrated cured meat is commercially available and is commonly referred to as jerky, jerked beef or jerked meat.

Commercially available, dehydrated cured meat products which contain more than 35 percent moisture can be dried in a conventional manner to within the above moisture content range.

Known biscuit dough formulations for the preparation of dry hard canine biscuits can be used in the production of the biscuits of the invention. As indicated above, these doughs generally have a water activity of about 0.90 and above upon completion of mixing of the dough ingredients. A suitable dough contains farinaceous material, an edible oil, an antioxidant, an antimycotic, salt, animal fat, and added vitamins and minerals, such as those disclosed in U.S. Pat. No. 4,229,485 at column 5, lines 7 to 57. The compositions of the invention also preferably contain at least one animal-derived proteinaceous meal such as meat meal, bone meal and fish meal. A preferred biscuit dough for producing the biscuits of the invention contains about 50 to about 60 percent by weight of wheat flour, about 5 to about 10 percent by weight of soybean meal, about 3 to about 10 percent by weight of meat and bone meal, about 1 to about 5 percent by weight of wheat meal, about 1 to about 5 percent by weight of animal fat preserved with BHA, about 20 to about 30 percent by weight of water, and about 2 to about 5 percent by weight of natural flavors, vitamin and mineral preblend, and acidulant. More generally, useful biscuit doughs can contain about 15 to about 35 percent by weight of water and about 0.5 to about 10 percent by weight of fat.

The relative amount of the meat and/or meat by-product particles and the biscuit dough should be such so as to result in a dried biscuit product wherein the weight percent of the particles is about 3 to about 15 percent by weight, preferably about 5 to 10 percent by weight, of the final dried biscuit product. Compliance to NRC nutritional requirements is enhanced by even these low levels of the 40 percent minimum protein meat and/or meat by-product particle. Lower or higher levels of the meat particles can be used provided biscuit integrity is maintained, the meat particles do not extend appreciably above the surface of the biscuit so as to separate from the biscuit during shipment, the final product remains visually attractive to the consumer, and the product is economical to produce.

In producing the dry, hard canine biscuit of the invention the meat and/or meat by-product particles are blended with the solid non-fat portion of the biscuit dough. By incorporating the meat particles into the solid non-fat portion of the biscuit dough, the meat particles are distributed substantially uniformly throughout the final biscuit product. The portion of the particles at the surface of the biscuit are visually apparent as discrete particles. Particles substantially below the surface however are also of sufficient size and integrity to be visually apparent as discrete particles upon breaking the biscuit in two, for example.

All mixing can be done at 20 to 100 rpm. The dry-blending step is typically conducted at room temperature for a period of time of about 3 minutes to about 10 minutes so as to obtain a uniform mixture of the meat and/or meat by-product particles and non-fat portion of the biscuit dough. The dry-blended mixture is then mixed with the hot water to form a first stage dough. This methodology minimizes the occurence of meat and/or meat by-product particles substantially above and on the final biscuit surface. As a result, the opportunity for meat and/or meat by-product particle loss from physical abuse during transit is reduced. The water which is admixed with the dry-blended mixture is typically at a temperature of about 65° to about 150° F. The hot water is added, with mixing, over a period of time of about 3 minutes to about 5 minutes to form the first stage dough. Then the fat portion of the biscuit dough is admixed with the first stage dough to form the final stage dough. The fat portion is added at a temperature at which it is at least fluid, typically at about 100° to about 150° F. The fat portion is mixed for a period of time which is sufficient to form a dough whose homogeneity is visually apparent. A typical final mixing time is about 3 minutes to about 5 minutes.

Formation of the dough is achieved at about atmospheric pressure with mixing of the components being conveniently achieved in an upright sigma blade mixer or other bakery-type mixers. The various ingredients can be added over a period of time or in a one-shot manner according to the above order of addition. However, melted fat and water may be added simultaneously and mixed 6 to 10 minutes.

The dough is then formed into pieces by machining on a rotary molder with specific die shapes. The dough can also be formed into pieces by sheeting followed by either a vertical or rotary cutter or by a rotary molder. Hardness of the final biscuit is enhanced by sheeting the dough prior to cutting or molding. Suitable die and cutter shapes are those which result in a round, square, triangular, T-bone or chop shaped biscuit product and the like. The forming is accomplished at conventional temperatures of ambient to 110° F. and pressures of less than 75 p.s.i. (gauge), used with for example a rotary molder, a vertical cutter of rotary cutter. An essential or critical feature of the invention is that the forming of the dough piece is done using low shear and/or low pressure forming means or techniques. High shear or high pressure forming will decimate or smear the meat and-/or meat by-products particles and/or will cause bleeding or running of any dye used in the particles. The forming pressure is less than 75 p.s.i.g.

The formed pieces are then baked, followed by drying, to achieve a shelf stable product without the need of a moisture barrier protection. Baking and drying temperatures and times are those conventionally used in the production of a hard, dry canine biscuit. The pieces are dried to obtain a biscuit having a water activity of 0.70 or less. Typical baking temperatures and times are about 300° F. to about 475° F. for about 25 minutes to about 8 minutes. Drying conditions are typically about 200° to about 325° F. for about 25 minutes to about 12 minutes in a forced air dryer. On a weight basis, the moisture content of the final biscuit product is less than or equal to about 15 percent by weight and preferably about 10 to about 12 percent by weight of the final biscuit at 70 percent relative humidity.

While typically adding meat to a biscuit softens it, the final dried biscuits of the invention should be sufficiently hard to stimulate the jaw bones and clean the teeth of canines. The hardness of the final biscuit of the invention as measured in a cracking test on a Dillon dynamometer should be about 30 to about 50 lbs. for a ½ inch thick sample using a pinpoint tester having a 3/32 inch diameter tip. The tip has a concave bottom with a maximum depth of 1/16 inch. In this test, the hardness reading in pounds is linearly proportional to the sample thickness. Thus, a ¼ inch thick sample should have a hardness of about 15 to about 25 lbs. An essential or critical feature of the invention is that the forming of the hard dough pieces is done using low shear and/or low pressure forming or techniques. High shear or high pressure forming will decimate or smear the meat and-/or meat by-product particles and/or will cause bleeding or running or any dye used in the particles. The forming pressure is less than 75 p.s.i.g.

Non-cooking forming conditions herein means that the forming is achieved at a temperature whereby none of the protein in the hard dough material is denatured and none of the starch in the hard dough material is gelatinized. Low-shear forming conditions herein means that forming is achieved at 25 sec.$^{-1}$ or less. (High shear herein means greater than 25 sec.$^{-1}$, which excludes the use of high-shear cooler extruders in the invention.) See Rossen and Miller, "Food Extrusion", *Food Technology*, August 1973, pages 46 to 53, (especially page 52).

The invention is further illustrated in the following examples wherein all percentages, parts, ratios and proportions are by weight and all temperatures are in °F., unless otherwise stated herein or otherwise obvious herefrom to one ordinarily skilled in the art.

EXAMPLE 1

In this example, spiced dehydrated cured beef granules having a moisture content less than 35 percent by weight, a granulation between 1/32 of an inch and ½ inch, and having a dark brown denatured meat protein color of Agtron reflectance value of 10 or less were used. The spiced dehydrated cured meat granules were obtained by granulating dehydrated cured meat having the composition:

| Dehydrated Cured Meat | Pounds |
|---|---|
| Meat By-Products | 650 |
| Meat | 268 |
| Natural Flavors | 1 |
| Spices | 29 |
| Cure (Sodium Nitrate) | 1 |
| Potassium Sorbate | 0.5 |
| | 949.5 pounds |

Then, 75 pounds of the spiced dehydrated cured meat granules were combined with the non-fat solids portion of a biscuit dough, the fat portion of the biscuit dough and water to form a dough in accordance with the process of the invention. The ingredients, relative amounts, and the process for making the biscuits were:

| Biscuit and Meat Chips | Pounds |
|---|---|
| Wheat Flour | 940 |
| Soybean Meal | 135 |
| Dehydrated Cured Meat | 103 |
| Meat and Bone Meal | 100 |
| Wheat Meal | 40 |
| Animal Fat preserved with BHA | 32 |
| Natural Flavors | 17 |
| Vitamin and Mineral Preblend | 25 |
| Acidulant | 4 |
| Water | 490 |
| | 1886 pounds |

The dehydrated cured meat was dry-blended with the solid non-fat portion of the biscuit dough in an upright sigma blade mixer at 20 rpm for 10 minutes. Then, the 490 pounds of water at a temperature of 150° F. was added together with 140° F. fat to the preblend and mixed for 6 minutes to form the dough. The dough was then machined on a rotary molder having a die engraved to a depth of 0.415 inch for the formation of approximately ½ inch thick round, T-bone and chop shapes. The formed places were then backed in a band oven for 9 minutes followed by drying at 250° F. for 20 minutes in a band dryer to achieve a dry, hard shelf stable product. The baking temperatures in the band oven were:

| Band Oven Baking Temperatures | Zone |
|---|---|
| 530° F. | 1 |
| 530 | 2 |
| 550 | 3 |
| 540 | 4 |
| 400 | 5 |
| 520 | 6 |
| Off | 7 |
| Off | 8 |
| Off | 9 |

The product was dump-packed into a carton without the need for moisture barrier protection.

Hardness tests on the product using a Dillon dynamometer as described above resulted in hardness readings in the range of 30 to 50 lbs.

The product and biscuits prepared in the same manner except for the inclusion of the meat granules were fed to dogs in 35 tests. The number of dogs in each test ranged from 11 to 32. The feedings were for 3 consecutive days in a split plate for testing preference. The biscuits were fed as a treat 4 to 5 hours after each dog's main meal. The main meal supplied 100 percent of each dog's calorie demand. The biscuit containing the meat granules was preferred up to 8:1 indicating a statistically significant preference level.

EXAMPLE 2

A Creusot Loire BC72 cooler extruder, having 1000 mm barrel, two barrel heaters and cooling means, was used. A base formulae or mixture was mixed in a dry ribbon blender and then passed to the cooker extruder.

The base formula, on a per batch basis, was:

| Ingredients | Amount |
|---|---|
| Wheat flour | 58 lbs. 12 oz. |
| Soyabean meal | 8 lbs. 7 oz. |
| Natural flavors | 5 oz. |
| Wheat meal | 2 lbs. 8 oz. |
| Meat and bone meal | 6 lbs. 4 oz. |
| Salt | 10 oz. |
| Vitamin-mineral premix | 12 oz. |
| Natural flavors | 12 oz. |
| Acidulant | 103 grams |
| Tallow | 1 lb. |
| Total | 76 lbs. 2 oz. |

All of the ingredients except the tallow were screened through a U.S. No. 10 Mesh screen. Beef jerky was used which went through a U.S. No. 4 Mesh screen and stayed on a U.S. No. 8 Mesh screen. All of the dry blend (base formula) was dry blended in the ribbon blender for 10 minutes. Depending on the particular experiment, various amounts of beef jerky particles were added to the mixture and the mixture was dry blended in a Hobart mixer. The tallow was then added to the subsequent mixture, followed by further dry blending to achieve a uniform mass.

The specifics are as follows:

| Experiment No. | Amount of Jerky | Water Content of Jerky | Amount of Oil sprayed in Jerky |
|---|---|---|---|
| H-1E | None | — | — |
| H-2E | 4 lbs. 2 ozs./ 76 lbs. 2 ozs. of base formula | 12% | 1% |
| H-3E | 4 lbs. 2 ozs./ 76 lbs. 2 ozs. of base formula | 25% | 1% |
| H-4E | 4 lbs. 2ozs./ 76 lbs. 2 ozs. of base formula | 35% | 1% |
| H-2RM+B | 17 lbs/1202 lbs. of base formula | 12% | None |
| H-2E+B | 17 gm/273 gm. of | 12% | None |

-continued

| Experiment No. | Amount of Jerky | Water Content of Jerky | Amount of Oil sprayed in Jerky |
|---|---|---|---|
| H-5E+B | base formula 34 gm/273 gm. of base formula | 12% | None |

Notes:
(a) H means base formula according to the above-cited ingredient proportions.
(b) RM + B means rotary molder followed by baking in a band oven
(c) B means baking in a reel oven.
(d) E means extrusion.
(e) The oil was sprayed on the jerky granules to simulate the preferred teaching in U.S. Pat. No. 4,310,558 (Nahm), but the oil did not prevent the jerky granules from being decimated by the high-shear extrusion or from being torn apart upon exiting from the extruder dye as the dough product expanded.

The control (H-1E) and the three experiments representing Nahm (H-2E and H-4E) were subjected to high shear cooker extrusion after dry blending. The data on the extrusion is:

| Material Extruded | Extruder Pressure Die | Extruder Screw Speed | Extrudate Temp. | Percent Added $H_2O$ in Extruder |
|---|---|---|---|---|
| H-1E | 103 to 146 psig | 160 r.p.m. | 160° F. | 10 |
| H-2E | 150 psig | 115 r.p.m. | 166° F. | 15 |
| H-3E | 122 to 182 psig | 110 r.p.m. | 172° F. | 15 |
| H-4E | 160 to 186 psig | 190 r.p.m. | 176° F. | 15 |

Note:
The extrudate temperatures were all over 160° F., which is at least sufficient to denature the protein. The material in the extruder was at a higher temperature because there was a flash off of the water as it exited from the extruder.

Further data on the extrusions is:

| Material Extruded | Extruder Barrell Heaters(2) | Extruder $H_2O$ Coolant | Extruder Die Opening |
|---|---|---|---|
| H-1E | 183°, 132° F. | 131° F. | 3/8" × 3/16" |
| H-2E | 181°, 116° F. | 130° F. | 3/8" × 3/16" |
| H-3E | 182°, 100° F. | 130° F. | 3/8" × 3/16" |
| H-4E | 158°, 123° F. | 115° F. | 3/8" × 3/16" |

More data on the extrusion and drying is:

| Material Extruded | Cutter Blade Setting | Extruder Drive Load | Drying The Extrudate Temp. | Time |
|---|---|---|---|---|
| H-1E | 6 | 33 amps | 200° F. | 1.5 hr |
| H-2E | 6 | 51 amps | 200° F. | 1.5 hr |
| H-3E | 6 | 48 amps | 200° F. | 1.5 hr |
| H-4E | 6 | 53 amps | 200° F. | 1.5 hr |

Note: The extrudates were dried in a Proctor Schwartz drier.

In addition to the above runs, experiment H-1E-1 was conducted the same as experiment H-1E except that the extruder pressure at the die was 250 p.s.i.g., and experiment H-2E-1 was conducted the same as experiment H-2E except that the extruder pressure at the die was 247 p.s.i.g.

The invention was represented by experiments H-2E+B and H-5E+B. In each case the water content in the dough was 32 percent. Extrusion was done in a low shear extruder (i.e., a meat grinder, "Kitchen Aid Grinder', with blades) using a die opening of 0.5 inch diameter. The manual cut off was 1 to 1.5 inch. The temperature of the extrudate was 90° F. and the actual pressure at the exit point at the back of the die was 30 to 40 p.s.i.g. The temperature of the dough processed in the low shear extruder never exceeded 105° F. and accordingly was not cooked in the low shear extruder. Both extruded materials were then baked in a reel oven at 350° F. for 36 minutes.

The invention was further represented by experiment H-2RM+B. The water content of the dough was 26 percent. The dough was compacted in a rotary molder at room temperature and at a pressure of less than 75 p.s.i.g. The compacted dough pieces were then baked in a band oven for 8 minutes using a starting temperature of 600° F., which fell to 200° F., and were dried for 20 minutes at 275° F.

The pet food pieces prepared by the several experiments had the following characteristics:

| Experiment Number | Sensory Observations | Agtron Color (lower reading means a darker color) |
|---|---|---|
| H-1E | Light tan; rough surface. Slight porosity noted on surface regions; random, very small particles visible | 45 |
| H-2E | Darker tan; rougher surface with many backwards extending ridges over valleys. Porosity noted on surface regions. Essentially no jerky granules showing; a few random, possibly smeared, very small particles. | 43 |
| H-1E-1 | Light tan; rough surface. Slight porosity noted on surface regions; random, very small particles visible. | |
| H-2E-1 | Darker tan; rougher surface with any backwards extending ridges over valleys. Porosity noted on surface regions. Essentially no jerky granules showing; a few random, possibly smeared, very small particles visible on the surface. | |
| H-3E | Darker tan; rough surface with many backwards extending ridges over valleys. Porosity noted on surface regions. Essentially no jerky granules showing; a few random, possibly smeared, very small particles. | 40 |
| H-4E | Darker tan; extremely rough surface with any backwards extending ridges over valleys; poor definition. Porosity noted on surface regions. Essentially no jerky granules showing; a few random possibly smeared, very small particles. | 38 |
| H-2E+B | Light, golden, brownish tan; discrete, non-smeared, large jerky particle visible throughout; there was good jerky granule integrity throughout. Somewhat rough surface with some backwards extending ridges. No visible porosity. | |

| Experiment Number | Sensory Observations | Agtron Color (lower reading means a darker color) |
|---|---|---|
| H-5E+B | Light, golden, brownish tan; discrete, non-smeared, large jerky particle visible throughout; there was good jerky granule integrity throughout. Somewhat rough surface with some backwards extending ridges. No visible porosity | |
| H-2RM+B | Light, golden, tannish brown; discrete, well defined, non-smeared, large jerky granules, there was excellent jerky granule integrity throughout. Undulating, slightly pocked surface. Good color contrast between discrete jerk granules and remaining biscuit surface. | |

What is claimed is:

1. A method for making dry hard canine biscuits having discrete meat and/or meat by-product particles distributed substantially uniformly throughout the biscuit comprising:
   (a) dry blending particles containing meat and/or meat by-product as substantial components having a moisture content of less than or equal to about 35 percent by weight with non-fat solids, said meat and/or meat by product particles being present in an amount sufficient to provide particles visible on the surface of said dry canine biscuits, said non-fat solids containing farinaceous material;
   (b) admixing about 20 to 30% by weight water with said dry blended mixture to form a first stage dough;
   (c) mixing about 0.5 to 10% by weight added fat with said first stage dough to form a final biscuit dough;
   (d) forming said final dough into pieces under low shear, non-cooking forming conditions; and
   (e) baking and drying said pieces to form dry hard biscuits,
wherein the water activity of said particles in step (a) is less than the water activity of a final dough obtained by admixing said non-fat solids, said fat and said water without said particles, and whereby dry, biscuits are produced having discrete visually-apparent meat particles distributed substantially uniformly throughout and embedded in the surface of said dry hard canine biscuits.

2. A method for incorporating meat and/or meat by-product particles into a biscuit dough to form dry hard canine biscuits, comprising;
   (a) dry blending particles containing meat and/or meat by-product as substantial components having a moisture content of less than or equal to about 35 percent by weight with non fat solids, said particles having a water activity which is less than the water activity of said biscuit dough, said particles being present in an amount sufficient to provide particles visible on the surface of said dry hard canine biscuits, said non-fat solids containing farinaceous material;
   (b) admixing about 20 to 30% by weight water with said dry blended mixture to form a first stage dough;
   (c) mixing about 0.5 to 10% by weight added fat with said first stage dough to form a final dough;
   (d) forming said final dough into pieces under low shear, non-cooking forming conditions without substantial smearing of said particles in said first stage dough or said final stage dough; and
   (e) baking and drying said pieces to form dry hard biscuits,
whereby the water activity of said dry biscuits is 0.70 or less and whereby said dry, hard biscuits are produced having discrete visually-apparent meat particles distributed substantially uniformly throughout and embedded in the surface of said dry hard canine biscuits.

3. In a method for making dry hard canine biscuits from a final biscuit dough the improvement comprising:
   (a) admixing particles containing meat and/or meat by-product as substantial components having a moisture content of less than or equal to about 35 percent by weight with non-fat solids to form a substantially homogeneous dry blended mixture, said particles being present in an amount sufficient to provide particles visible on the surface of said dry hard canine biscuits, said non-fat solids containing farinaceous material;
   (b) admixing about 20 to 30% by weight water with said dry blended mixture to form a first stage dough;
   (c) mixing about 0.5 to 10% by weight added fat with said first stage dough to form said final biscuit dough;
   (d) forming said final biscuit dough into pieces under low-shear non-cooking forming conditions which maintain the discreteness of said particles, using a forming pressure of less than 75 p.s.i.g.; and
   (e) baking and drying said pieces to form said dry hard biscuits, having a water activity of 0.70 or less and being shelf stable, whereby a dry, hard biscuit is produced having discrete visually-apparent meat particles distributed substantially uniformly throughout and embedded in the surface of said dry hard canine biscuits.

4. The method as claimed in claim 3 wherein said meat and/or by-product particles are present in step (a) in an amount of about 3 to about 15 weight percent, based on the total weight of said dry hard canine biscuit.

5. The method as claimed in claim 3 wherein said water and fat portion in steps (b) and (c) are added simultaneously to the dry mixture of step (a).

6. The method as claimed in claim 3 wherein the particles of step (a) are shelf stable meat particles.

7. The method as claimed in claim 3 wherein the particles of step (a) have a moisture content of less than or equal to about 20 percent by weight of the particles.

8. The method as claimed in claim 3 wherein said pieces of step (e) are dried to a moisture content of 10 to 12 percent by weight of the biscuit.

9. The method as claimed in claim 3 wherein said biscuits have a hardness equivalent to a reading of 30 to 50 lbs. for a biscuit having a thickness of about ½ inch measured on a Dillon dynamometer having a pinpoint tester with a 3/32 inch diameter tip having a concave bottom.

10. The method as claimed in claim 3 wherein said particles have a granulation of between about 1/32 inch and about ½ inch.

11. The method as claimed in claim 3 wherein said particles comprise spiced dehydrated meat particles.

12. The method as claimed in claim 3 wherein said particles have a dark brown denatured meat protein color of Agtron reflectance value of 10 or less.

13. The method as claimed in claim 3 wherein said particles are spiced, dehydrated, cured meat granules.

14. The method as claimed in claim 3 wherein the meat particles of step (a) have a water activity of 0.70 or less.

15. The method as claimed in claim 3 wherein the water which is admixed with the dry blended mixture is at a temperature of about 65° F.

16. The method as claimed in claim 3 wherein the fat portion of the biscuit dough is added at a temperature of about 100° to about 150° F.

17. The method as claimed in claim 3 wherein said dry blending is for a period of time of about 3 minutes to about 10 minutes, the dry blended mixture is mixed with water for a period of time of about 3 minutes to about 5 minutes, and wherein said mixing of the fat portion is for a period of time of about 3 minutes to about 5 minutes.

18. The method as claimed in claim 3 wherein said forming of said final dough into pieces is on a rotary molder.

19. The method as claimed in claim 3 wherein said pieces are formed by sheeting said final dough followed by molding in a rotary molder.

20. The method as claimed in claim 3 wherein said pieces are formed by sheeting said final dough followed by cutting with a vertical cutter or a rotary cutter.

* * * * *